United States Patent [19]

Saito

[11] Patent Number: 5,041,937

[45] Date of Patent: Aug. 20, 1991

[54] HEAD DRUM FORMING AN AIR FILM BETWEEN AN OUTER SURFACE THEREOF AND A TAPE MEDIUM

[75] Inventor: Takehiko Saito, Chiba, Japan

[73] Assignee: Sony Corporation, Tokyo, Japan

[21] Appl. No.: 480,669

[22] Filed: Feb. 15, 1990

[30] Foreign Application Priority Data

Feb. 17, 1989 [JP] Japan .................................. 1-37733

[51] Int. Cl.⁵ .......................................... G11B 15/60
[52] U.S. Cl. ................................. 360/130.24; 360/85
[58] Field of Search ...................... 360/130.24, 84–85, 360/102, 107

[56] References Cited

U.S. PATENT DOCUMENTS 4,040,109  8/1977  Kryltsov .
4,517,615  5/1985  Hino .

FOREIGN PATENT DOCUMENTS 2903197    8/1979   Fed. Rep. of Germany .
54-24609   2/1979   Japan ............................. 360/130.24
57-92418   9/1982   Japan .
59-142728  12/1984  Japan .
61-261810  4/1987   Japan .
62-289954  12/1987  Japan ............................. 360/130.24

Primary Examiner—A. J. Heinz
Attorney, Agent, or Firm—Alvin Sinderbrand; William S. Frommer

[57] ABSTRACT

A head drum for a recording and/or reproducing apparatus is provided. The head drum includes a rotary drum, a stationary drum, and a plurality of magnetic heads for recording and/or reproducing signals on a magnetic tape. A chamber is provided which includes a first circumferentially extending recessed portion formed on the rotary drum and a second circumferentially extending recessed portion formed in the stationary drum. A plurality of grooves are formed in a surface of the rotary drum which communicates between the chamber and the exterior of the head drum. In a first embodiment, the second recessed portion is eccentrically arranged to extend closer to a first position on an exterior surface of the head drum where the magnetic tape starts to wrap about the head drum than at a second position on said exterior surface. In an alternative embodiment, the second circular recessed portion has a greater depth from the first circular recessed portion at the first position than at the second position. The recesses are provided to form a uniform air film between the magnetic tape and the head drum in cooperation with circumambient air introduced therebetween.

25 Claims, 8 Drawing Sheets

HEAD DRUM FORMING AN AIR FILM BETWEEN AN OUTER SURFACE THEREOF AND A TAPE MEDIUM

BACKGROUND OF THE INVENTION

The present invention relates generally to a head drum for a video tape recorder. More particularly, the invention relates to an improved head drum which forms a uniform air film between a recording medium such as a magnetic tape and an area of the head drum wrapped by the tape to reduce wear on the tape and on the peripheral surface of the head drum and to reduce resistance to tape travel.

The recording operation of, for example, a video tape recorder (VTR) or a rotary head type digital audio tape recorder (R-DAT) is carried out by a head drum which forms tracks on a magnetic tape wrapped about the head drum, extending at an angle with respect to the direction of tape travel. The conventional head drum typically includes a stationary drum installed on a mechanical chassis, a rotary drum rotatable relative to the stationary drum spaced with a predetermined axial gap from the stationary drum, and a plurality of magnetic heads exposed at an outer surface of the rotary drum. A lead surface having a stage edge is formed to extend helically on the peripheral surface of the head drum. When recording or reproducing, the magnetic tape travels along the lead surface while wrapping thereabout at a given angle according to the rotation of the head drum. Diagonal recording tracks are formed on the magnetic tape by the head drum in the recording operation, while in a play operation the head drum scans the diagonal tracks to read signals from the magnetic tape.

Rotation of the head drum causes circumambient air to follow the peripheral surface thereof. The air flows between the magnetic tape and the peripheral surface of the head drum from the position where the magnetic tape starts to wrap about the head drum forming an air film. Accordingly, the tape wrapped about the head drum travels thereover assisted by the air film.

It will be appreciated that, as the magnetic tape travels, it is separated slightly from the peripheral surface by the air film, preventing wear on the outer surface of both the head drum and the magnetic tape and reducing tape traveling resistance to achieve stable operation.

However, the formation of the air film is dependent upon the direction of magnetic tape travel and the rotation of the rotary drum, often resulting in an uneven air film thickness. Usually, the thickness of the air film is greater at the initial tape wrap position, while it becomes thinner approaching the final wrap position. Thus, the separation of the magnetic tape from the peripheral surface of the head drum is too great at the initial position for stably engaging the rotary head thereat and is too close to the rotary drum at the final wrap position. Due to this variation in the engagement of the magnetic tape with the head drum from the initial tape wrap position to the final wrap position, the frequency characteristics produced when recording or reproducing are diminished and tape traveling resistance is increased, resulting in damage to the magnetic tape, wear on the head surfaces, and playback jitter.

To solve such problems caused by the uneven air film, it has been proposed that the back tension of the magnetic tape be adjusted, and that a hole be provided to communicate with the inside of the head drum and formed near the initial tape wrap position to partially discharge air to the inside thereof so as to maintain the air film at a constant thickness in the vicinity of the initial tape wrap position, together with the provision of a pump-out groove formed between the upper and lower drums for positively discharging air from the inside of the head drum to the outside thereof.

However, it is practically impossible to form a uniform air film by adjusting the back tension in order to vary the tension between the initial and final tape. Moreover, the presence of the hole causes injury to the magnetic tape at the edge of the hole. Further, with the use of the pump-out groove, the air film thickness is increased at the final tape wrap position, but the air film becomes too thick in the vicinity of the initial tape wrap position. It has been proposed to select the size or orientation of the groove to form a uniform air film. This means however cannot sufficiently achieve a uniform air film over the entire range between the initial and final tape wrap positions.

SUMMARY OF THE INVENTION

It is accordingly an object of the present invention to provide a head drum which can achieve a uniform air film between a recording medium and a circumferential area of the head drum wrapped by the recording medium to overcome the above drawbacks.

According to one aspect of the present invention, a drum apparatus is provided for producing an air film between an outer surface thereof and a tape medium wrapped about at least a portion of said outer surface. The drum apparatus comprises a stationary drum and a rotary drum positioned coaxially with the stationary drum and having respective opposed surfaces defining a gap therebetween. A plurality of spiral grooves are formed in the respective opposed surface of the rotary drum extending from an inner position on the respective opposed surface of the rotary drum to an outer periphery thereof for producing an air film by discharging air out from an inner portion of the drum apparatus to the outer surface thereof in response to rotation of the rotary drum. A peripheral portion of the respective opposed surface of the stationary drum extending at least partially circumferentially about the axis of the stationary drum is ring shaped. The width of the ring shaped peripheral portion at an initial circumferential position where the tape medium begins to wrap around the outer surface of the drum apparatus is narrower than at a final circumferential position where the wrapping terminates.

According to another aspect of the invention, a drum apparatus is provided for producing an air film between an outer surface thereof and a tape medium wrapped about at least a portion of the outer surface. The drum apparatus comprises a stationary drum and a rotary drum positioned coaxially with the stationary drum, the stationary and rotary drums having respective opposed surfaces defining a gap therebetween. A plurality of spiral grooves are formed in the respective opposed surface of the rotary drum extending from an inner position thereof to an outer periphery thereof for producing an air film by discharging air out from an inner portion of the drum apparatus to the outer surface thereof in response to rotation of the rotary drum. The predetermined gap is wider at a first circumferential starting position where the tape medium begins to wrap around the outer surface of the drum apparatus than at a second circumferential position where the wrapping terminates.

According to a further aspect of the present invention, a head drum for a recording and/or reproducing apparatus is provided which comprises a stationary drum, a rotary drum opposing the stationary drum, the stationary and rotary drums defining a gap therebetween. Recording and/or reproducing means for recording signals on and/or reproducing signals from a recording medium is provided on a surface of the rotary drum adjacent to the stationary drum. The head drum defines a chamber therein. A means is provided for discharging air from the chamber to a position outside of the head drum during rotation of the rotary drum; and additional means is provided for controlling the flow rate of the discharged air such that it increases from a first position where in operation the recording medium starts to wrap about a peripheral surface of the head drum to a second position where the wrapping of the recording medium thereabout terminates so that the discharged air forms a substantially uniform air film between the recording medium and the peripheral surface of the head drum in cooperation with circumambient air introduced therebetween with the rotation of the rotary drum.

In a preferred mode, the chamber is defined by a first circumferentially extending recessed portion formed in the rotary drum and a second circumferentially extending recessed portion formed in the stationary drum. The second recessed portion is eccentrically disposed towards the first position for discharging at a flow rate which is less than that at the second position.

The means for discharging air includes a plurality of grooves formed in a surface of the rotary drum facing the stationary drum for discharging the air in the chamber to the outside thereof.

The grooves are arc-shaped and arranged in the surface of the rotary drum at regular intervals.

Alternatively, the chamber is defined by a first circumferentially extending recessed portion provided in the rotary drum and a second circumferentially extending recessed portion provided in the stationary drum. The means for discharging air includes a plurality of grooves communicating between the first recessed portion and the exterior of the head drum and a stepped portion formed in a surface of the stationary drum facing the rotary drum such that the stepped portion is farthest from the rotary drum at the first position and becomes progressively closer thereto circumferentially from the first position to the second position to provide the greatest flow rate of discharged air through the grooves at the second position.

The stepped portion includes a plurality of stages. The stages decrease in depth with respect to the rotary drum from the first position to the second position so that the flow rate of air discharged to the outside of the head drum through the grooves is greatest at the second position.

According to a still further aspect of the invention, a head drum is provided for a recording and/or reproducing apparatus which comprises a stationary drum and a rotary drum opposing the stationary drum, the stationary drum and the rotary drum defining a gap therebetween. A means is provided for recording signals on and/or reproducing signals from a recording medium wrapping about a circumferential surface of the head drum and is located on a surface of the rotary drum adjacent to the stationary drum. The head drum defines an air chamber therein and first means is provided for discharging air in the chamber through said circumferential surface of the head drum. In addition, a second means is provided for restricting the flow rate of air discharged through said circumferential surface by the first means in a vicinity of said circumferential surface where in operation the rotary drum engages the recording medium as it wraps about the circumferential surface of the head drum so that the discharged air forms an essentially uniform air film between the recording medium and the circumferential surface of the head drum in cooperation with circumambient air introduced therebetween in response to the rotation of the rotary drum.

In a preferred mode, the chamber is defined by a first circumferentially extending recessed portion formed in the rotary drum and a second circumferentially extending recessed portion formed in the stationary drum. The second recessed portion is eccentrically disposed towards a first position where in operation the recording medium starts to wrap about the circumferential surface of the head drum for discharging air at a flow rate less than that at a second position where the wrapping of the recording medium terminates.

The first means includes a plurality of grooves formed in a surface of the rotary drum facing the stationary drum for discharging the air in the chamber through the circumferential surface of the head drum.

The grooves are arc-shaped and formed in the surface of the rotary drum at regular intervals.

Alternatively, the chamber is defined by a first circumferentially extending recessed portion provided in the rotary drum and a second circumferentially extending recessed portion provided in the stationary drum. The first means includes a plurality of grooves formed in a surface of said rotary drum facing said stationary drum and communicating between the first recessed portion and the exterior of the rotary drum. The second means includes a portion formed in a surface of the stationary drum facing the surface of the rotary drum such that the portion is spaced farthest from the surface of the rotary drum at a first position where in operation the recording medium starts to wrap about the circumferential surface of the head drum and is arranged progressively closer to the surface of the rotary drum at circumferential positions progressing from said first position to a second position where the wrapping of the recording medium terminates to provide the greatest flow rate of discharged air at the second position.

The portion is stepped and includes a plurality of stages each of which is spaced by a respective distance from the surface of the rotary drum which decreases from the first position to the second position so that the flow rate of air discharged to the outside of the head drum through the grooves is greatest at the second position.

An air intake hole preferably is formed in the rotary drum for introducing circumambient air into the chamber.

BRIEF DESCRIPTION OF THE DRAWINGS

The present invention will be understood from the detailed description given hereinbelow and from the accompanying drawings of the preferred embodiment of the invention which are not intended to limit the invention to a specific embodiment but are provided for explanation and understanding only.

DESCRIPTION OF THE PREFERRED EMBODIMENT

Figure 1:
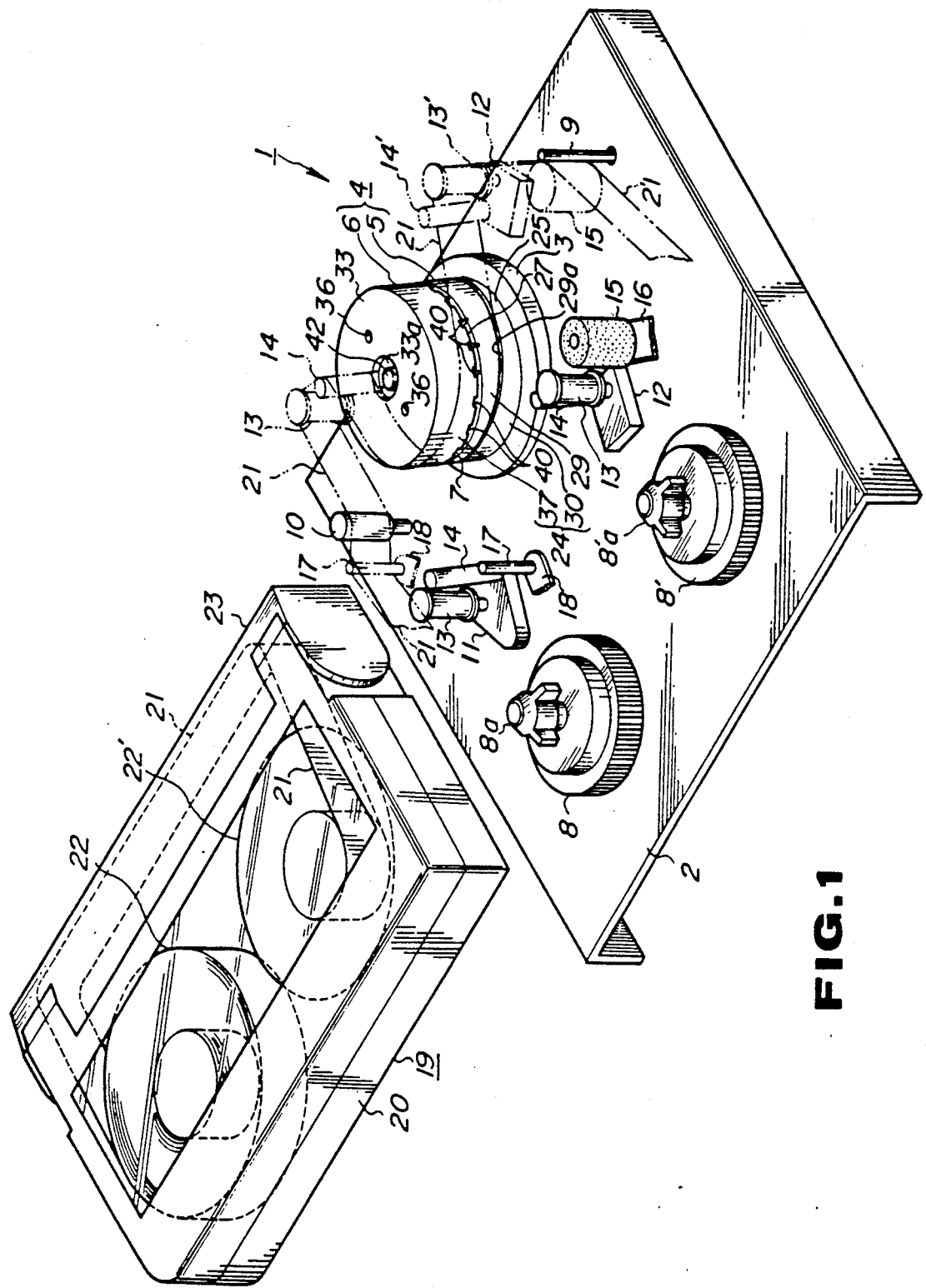
FIG. 1 is a perspective view which shows a magnetic tape cassette and a recording and/or reproducing mechanism incorporating a head drum in accordance with the present invention.

Referring now to the drawings, and particularly to FIG. 1, a recording and/or reproducing system of a VTR which has a head drum according to the present invention and a magnetic tape cassette are shown. A rotary head drum 4 is installed on a drum base 3 which is mounted to the rear of a mechanical chassis 2 of a VTR 1. The rotary head drum is slightly inclined with respect to a vertical axis of the mechanical chassis 2 at a given angle and includes an upper rotary drum 6, a lower stationary drum 5, and magnetic heads 7 supported on a lower surface of the upper drum.

A supply reel table 8 and a take up reel table 8' are arranged forwardly on the mechanical chassis 2 separated from each other by a given interval. A capstan 9 is provided at a right side of the rotary head drum 4 which is driven by a capstan motor (not shown). A guide pole 10 is installed at a left side of the head drum 4.

Tape loading bases 11 and 12 are movable between a loading start position indicated by a solid line and a loading end position indicated by a broken line and each includes a vertical guide post 13 and a inclined guide post 14. A pinch roller 15 which serves to guide the travel of the magnetic tape in cooperation with the capstan 9 is rotatably supported on a shaft of a pinch roller arm pivotably supported on the mechanical chassis 2. A tension regulating pin 17 (also referred to as a back tension regulating pin) is pivotably supported on the end of a tension regulating are 18. The pinch roller 15 and the tension regulating pin 17 are also movable, in the course of the loading operation, from respective loading start positions indicated by a solid line to respective loading end positions indicated by a broken line. In a tape cassette 19, a magnetic tape 21 is wound on tape reels 22 and 22' and a portion thereof is exposed through an access opening of a casing 20 which is covered by an openable front lid 23.

In operation, insertion of the tape cassette 19 into the VTR 1 causes engaging holes formed in the tape reels 22 and 22' to be received on reel pawl hubs 8a and 8a' respectively. The openable front lid 23 opens to expose a portion of the magnetic tape, while the vertical guide posts 13, the inclined guide posts 14, the pinch roller 15, and the tension regulating pin 17 are positioned behind the exposed magnetic tape in the access portion of the tape cassette.

With such arrangement, the initiation of the tape loading operation causes the tape loading bases 11 and 12, the pinch roller 15, and the tension regulating pin 17 to be displaced towards the final loading position, whereby the magnetic tape 21, as shown by the broken line in FIG. 1, is withdrawn from the tape cassette 20 and a portion thereof is wrapped helically about a peripheral surface 24 of the head drum at a given angle.

When the recording of reproducing operation initiates, the capstan 9 and the head drum 6 rotate in a counterclockwise direction, while the take up reel table 8' rotates in a clockwise direction, causing the magnetic tape 21 to travel. It will be appreciated that rotation of the capstan 9 causes a portion of the magnetic tape 21 pressed against the capstan by the pinch roller 15 to travel, winding about the take-up reel 22 of the tape cassette 19 as the rotary magnetic heads scan the tape. In such operation, the rotary magnetic heads 7 record signals on the magnetic tape, forming slanting tracks on the surface thereof. The rotary magnetic heads 7 encode the tracks with signals in a record mode and, alternatively, scan the tracks to read out signals previously recorded on the magnetic tape in a play mode.

Referring to FIGS. 2 to 5, a head drum according to a first embodiment of the present invention is illustrated therein. The lower drum 5 is integrally formed of a metal disc portion 25 and a cylindrical metal boss 26. A recessed portion 28 is formed in the upper surface of the disc portion 25 so that it is open to the bottom surface of the upper drum 6. The boss 26 projects vertically from the central portion of the disc portion 25.

Formed on the circumferential surface 30 of the disc portion 25 is a staged or lead surface 29 which defines a tape wrapping position about the head drum 4 relative to the axial direction of the disc portion. An edge 29a formed between the lead surface and a circumferential surface 30 is arranged slanting so that it is highest at the initial tape wrapping position 30a at which the magnetic tape contacts the circumferential surface of the head drum initially and is lowest at a final tape wrapping position 30b where the wrapping of the magnetic tape about the head drum terminates.

The circular recessed portion 28 is eccentric with respect to the center axis of the disc portion 25 so that it is biased towards the tape wrapping initial position 30a. Accordingly, the wall thickness defined between circumferential surface 30 and the inner surface of the recessed portion 28 is thinnest at the initial tape wrapping position while it is thickest at the final tape wrapping position. Therefore, the upper surface of the disc portion 25 in the form of a ring-shaped surface 27a adjacent the bottom of the upper drum 6 is narrowest at the initial tape wrapping position 30a and becomes gradually wider approaching the final tape wrapping position 30b.

Figure 3:
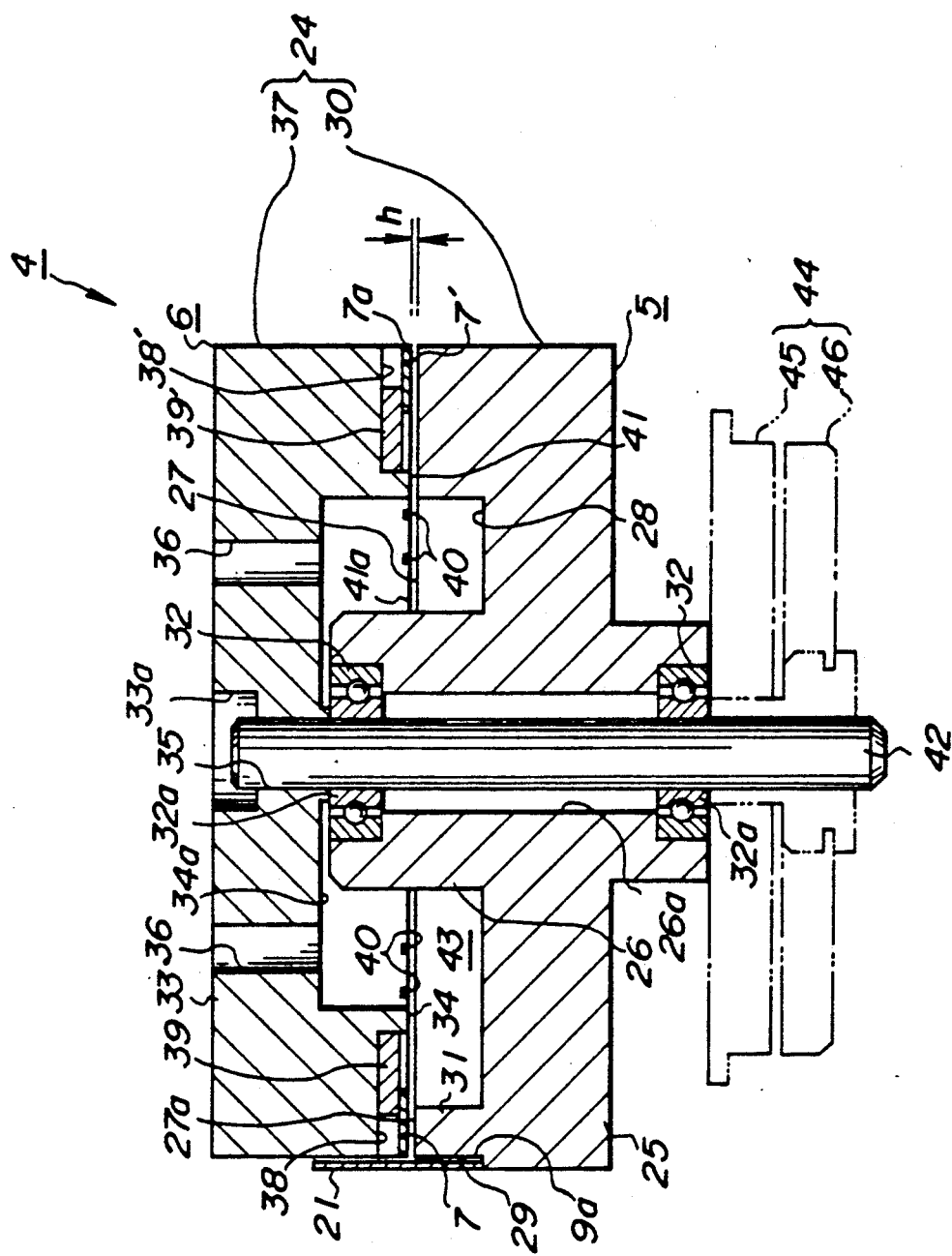
FIG. 3 is a longitudinal sectional view of the head drum according to the first embodiment.
Figure 4:
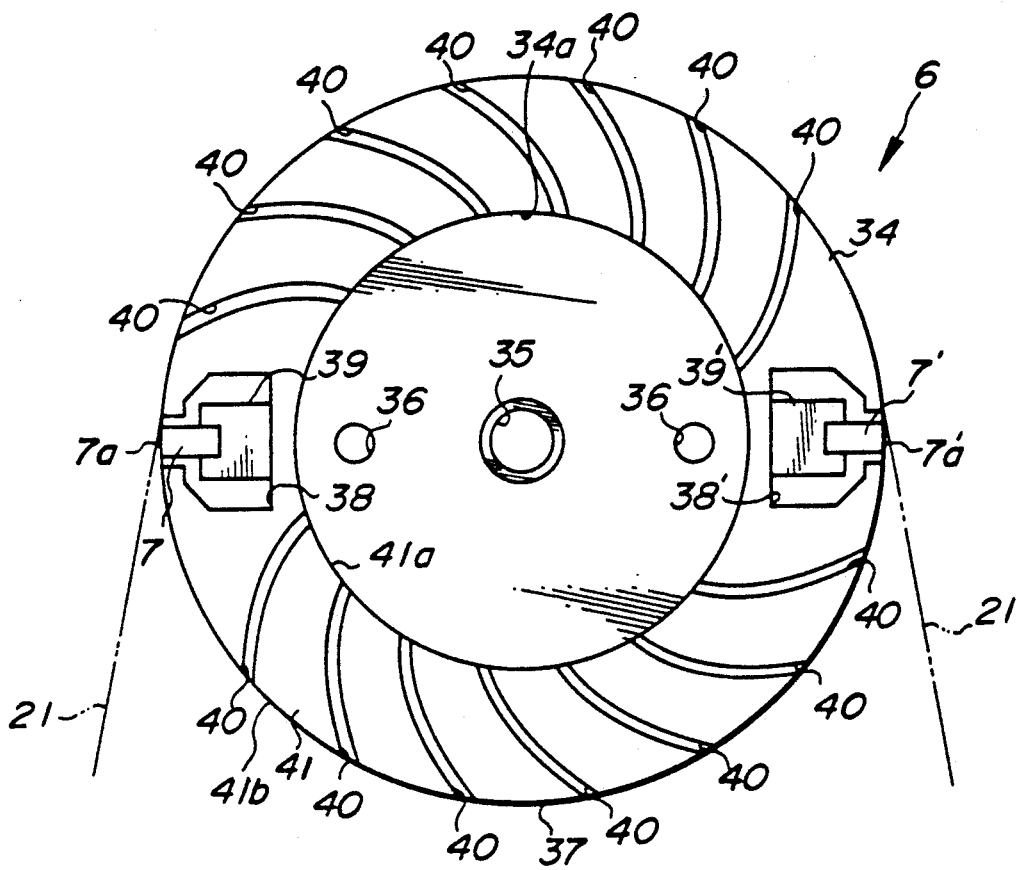
FIG. 4 is a bottom view which shows an upper rotary drum of the head drum according to the first embodiment.
Figure 5:
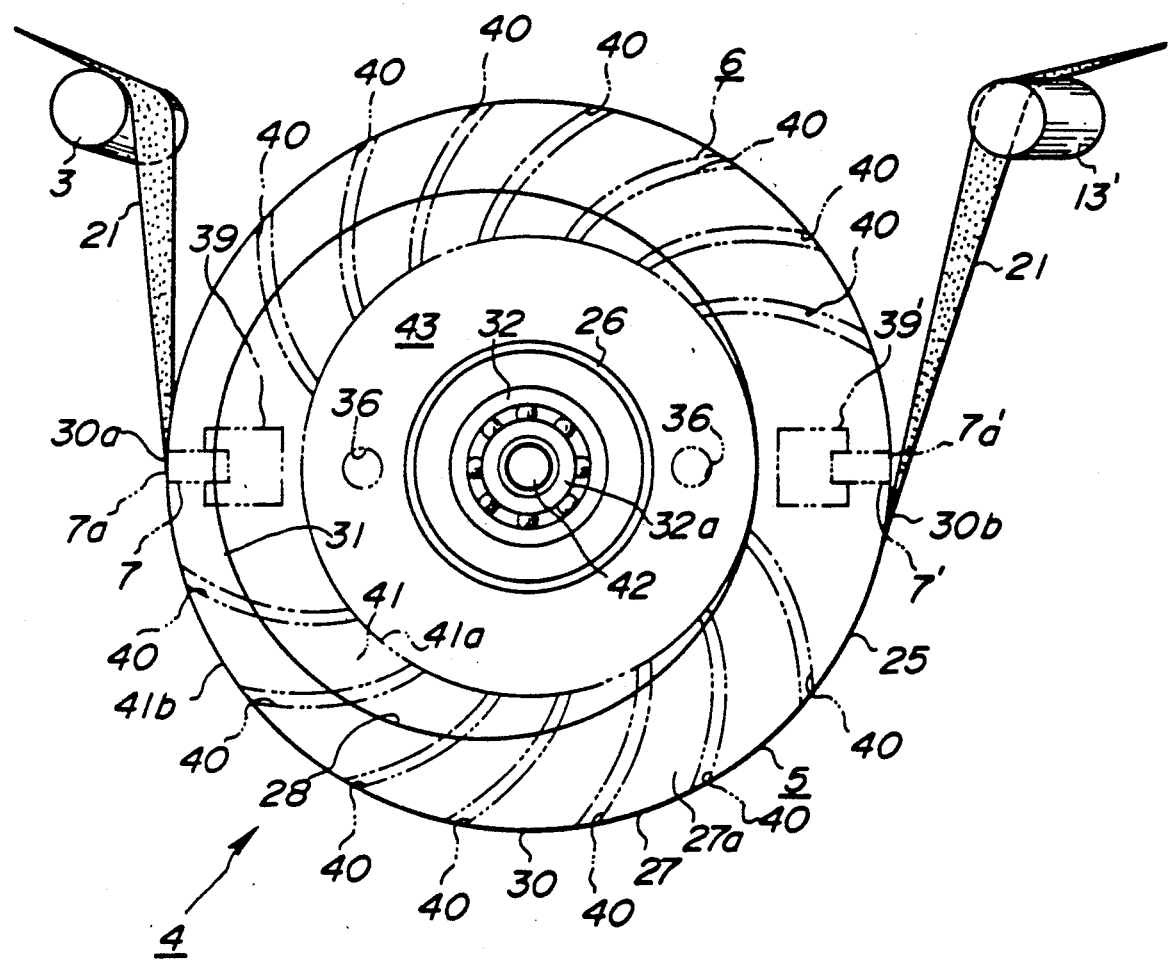
FIG. 5 is a plan view which shows a plurality of air outlet ports formed in an upper rotary drum, as indicated by a broken line, and a lower stationary drum in accordance with the first embodiment.
Figure 6:
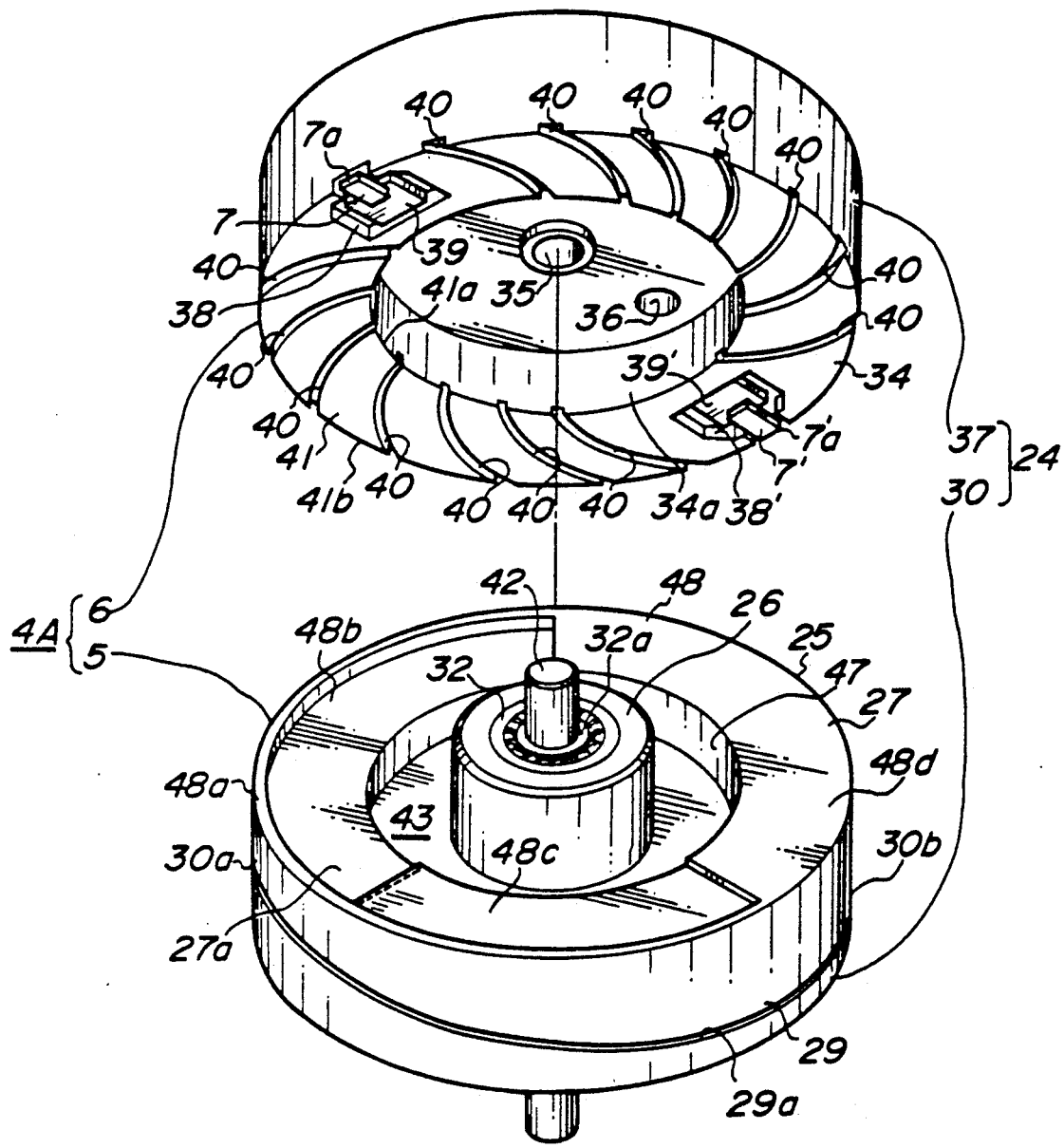
FIG. 6 is an exploded perspective view which shows a second embodiment of a head drum in accordance with the present invention.
Figure 7:
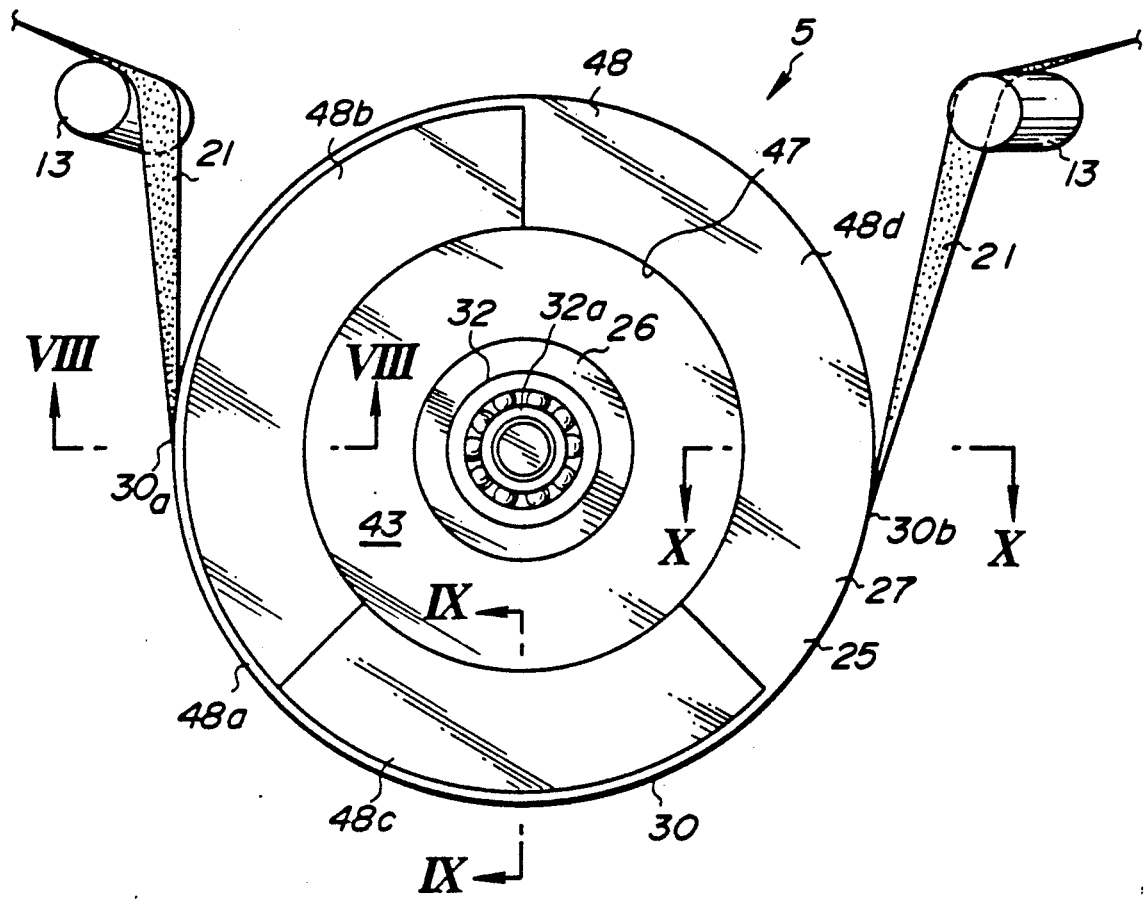
FIG. 7 is a plan view which shows a lower stationary drum of the second embodiment.
Figure 8:
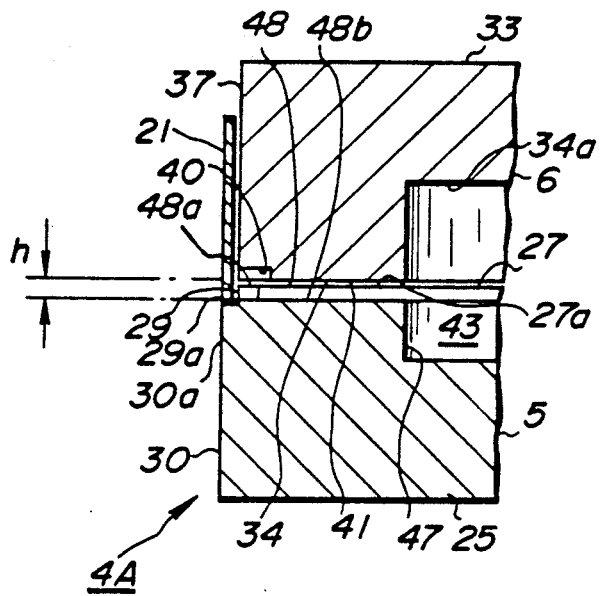
FIG. 8 is an enlarged sectional view taken along the line VIII—VIII of FIG. 7.
Figure 10:
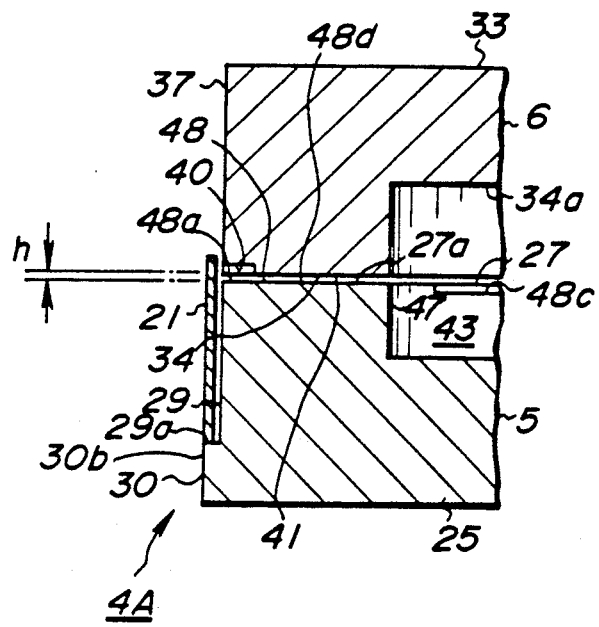
FIG. 10 is an enlarged sectional view taken along the line X—X of FIG. 7.
Figure 9:
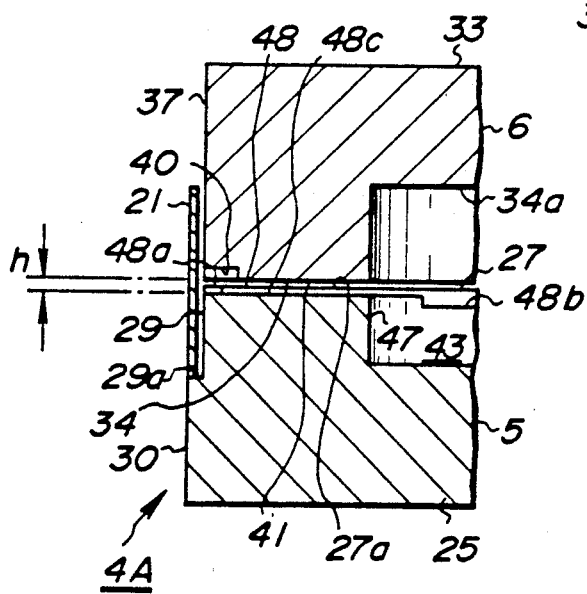
FIG. 9 is an enlarged sectional view taken along the line IX—IX of FIG. 7.

With reference also to FIG. 3, ball bearings 32 are pressed into the upper and lower end portions of a housing 26a formed through the boss 26. The lower drum 5 is installed on the mechanical chassis via a mounting plate (not shown) screwed to the drum base 3.

The size of the upper drum 6 is substantially equal to that of the lower drum 5 in diameter and height. As shown in FIG. 3, circular recessed portions 33a and 34a are formed in central areas of the upper and lower surfaces 33 and 34, respectively. A press-fit through hole 35 is formed in the center of the upper drum 6 and air intake holes 36 are formed symmetrically opposite the press-fit hole 35. In the outer end portions of the lower surface 34, recessed portions 38 and 38' are formed which open to the outside of the upper drum 6.

The rotary magnetic heads 7 and 7' are supported by head bases 39 and 39' respectively. Each magnetic head is mounted in the recessed portion of the upper drum 6 with an exposed tape contact surface 7a thereof lying in the same plane as the circumferential surface of the upper drum 6.

Figure 2:
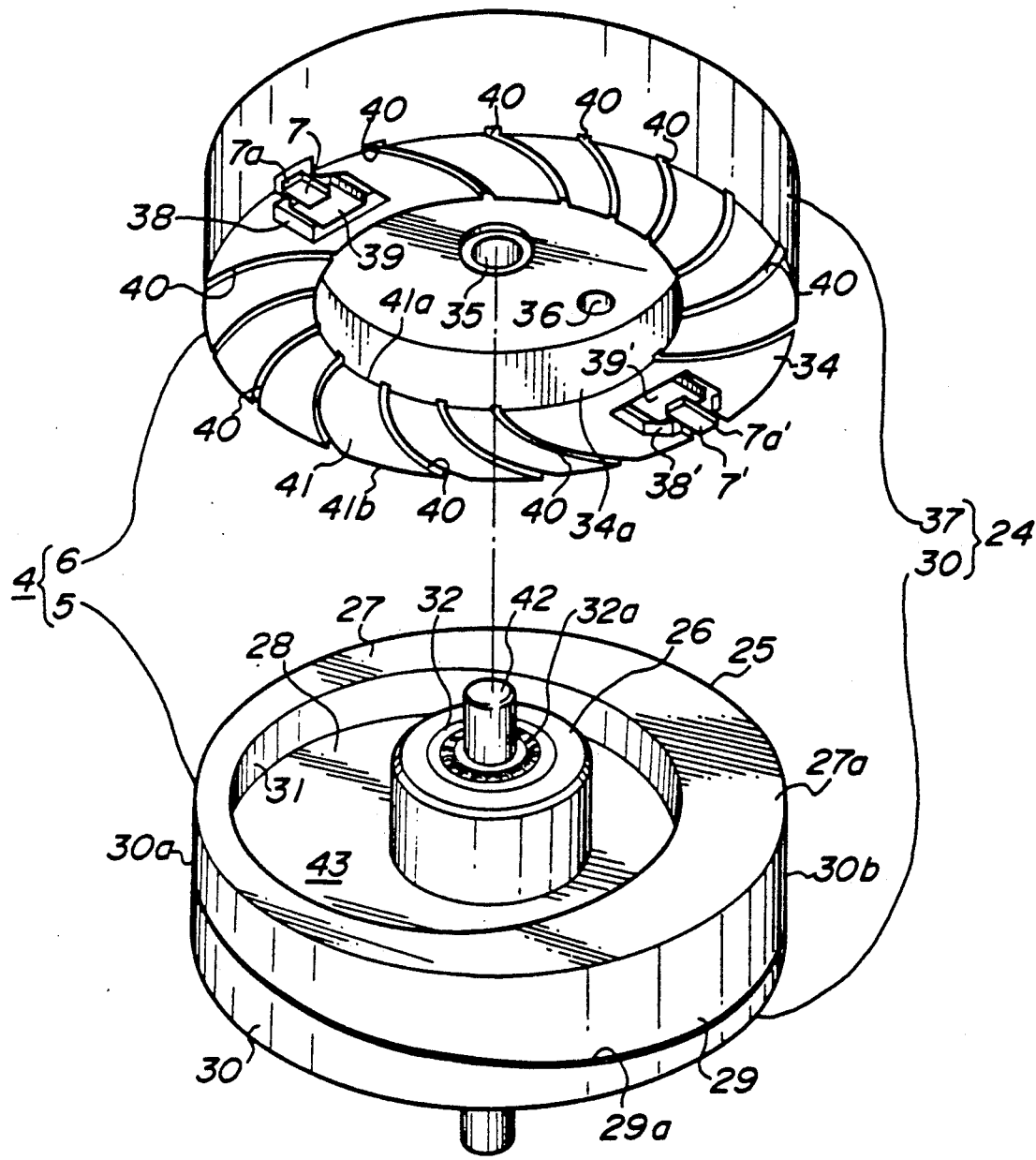
FIG. 2 is an exploded perspective view which shows a head drum in accordance with a first embodiment of the present invention.

As shown in FIG. 2, a plurality of grooves are formed in a ring-shaped surface 41 of the bottom of the upper drum 6 which open to the ring-shaped surface 27a of the lower drum 5. Each groove extends from an inside wall 41a to an outside wall 41b and is radially curved in the counterclockwise direction as viewed from the lower side, that is, in a direction opposite to the rotation of the upper drum 6. They are circumferentially arranged at regular intervals except at areas in which the magnetic heads are disposed, to discharge air from within the head drum 4 to the outside thereof.

A drive shaft 42 is pressed into inner rings 32a of the ball bearings 32. A portion thereof projecting from the boss 26 of the lower drum 5 is also pressed into the press-fit hole 35 of the upper drum 6.

The upper drum 6 is fixed on the drive shaft 42 rotatably supported by the lower drum 5 with a clearance h (see FIG. 3) provided between the upper and lower drums, forming an inner chamber 43 defined between the recessed portions 28 and 34a in the head drum 4. The grooves communicate from the chamber 43 to the outside of the head drum 4.

A flat motor 44 for driving the upper drum is comprised of a stator 45 fixed on the mechanical chassis 2 and a rotor 46 supporting the drive shaft 42.

As mentioned above, the width of the ring-shaped surface 27a of the lower drum 5 is narrowest at the initial tape wrapping position 30a, while it becomes gradually wider approaching the final tape wrapping position 30b. The width of the ring-shaped lower surface 41 of the upper drum 6 measured from its inner to outer circumferences is equal at all positions about the circumference thereof. It will be noted that the area defined between the opposing ring-shaped surfaces 27a and 41 is narrowest at the initial tape wrapping position 30a, while it becomes gradually wider towards the final tape wrapping position 30b.

During operation, the magnetic tape wraps about the circumferential surface of the head drum starting at the tape wrapping initial position 30a and terminating at the final wrapping position 30b.

The upper drum 6, as described above, rotates in a counterclockwise direction as viewed at the upper surface. This motion causes circumambient air around the outer surface 37 to follow thereon. Therefore, the rotation of the upper drum 6 with the magnetic tape 21 wrapping about the head drum 4 causes the air moving along with the outer surface 37 to be inserted between the outer surface 37 and the magnetic tape 21 from the initial tape wrapping position to form an air film.

Since the air intake holes 36 are provided in the upper drum which communicate with the inner chamber 43, the rotation of the upper drum 6 causes circumambient air around the head drum to be introduced into the inner chamber 43 from the air intake holes. This air is then discharged continuously to the outside of the head drum through the grooves 40 and a portion thereof is introduced between the outer surface 24 of the head drum 4 and the magnetic tape 21 wrapping thereabout to form the air film.

An amount of air V discharged to the outside of the head drum through the grooves 40 is defined by the following equation with respect to the air pressure $P_a$, a coefficient of viscosity of air $\mu$, the clearance h between the upper and lower drums 5 and 6, angular velocity $\omega$, and an area $R_o^2 - R_i^2$ defined by portions of the ring-shaped surfaces of the upper and lower drums 5 and 6 opposing each other ($R_o$ is defined as a distance from the axis to the outer edge of the ring-shaped surface 27a, and $R_i$ is defined as a distance between the axis and the inner edge of the ring-shaped surface 27a).

$$v = \frac{3 \mu \omega (R_o^2 - R_i^2)}{P_a h^2}$$

As the area $(R_o^2 - R_i^2)$ is smallest at the initial tape wrapping position 30a and it becomes gradually wider towards the final tape wrapping position 30b gradually, in accordance with the above formula, the amount of air discharged between the magnetic tape and the outer surface 24 of the head drum 4 through the grooves 40 is smallest at the initial tape wrapping position, while it increases as it nears the final tape wrapping position 30b.

Therefore, the air moving together with the outer surface 37 of the upper drum 6 is introduced between the circumferential surface 24 of the head drum and the magnetic tape 21, forming an air film which is thickest at the initial tape wrapping position 30a. The amount of the air discharged between the circumferential surface 24 and the magnetic tape through the grooves 40 however is increased approaching the final tape wrapping position 30b, resulting in an air film formed of circumambient air mixed with air discharged by the grooves 40 which has a uniform thickness over the range between the tape wrapping initial and final positions.

Referring to FIGS. 6 to 10, a head drum 4A of a second embodiment is illustrated therein. The head drum 4A differs from the head drum 4 of the first embodiment as previously described in that the areas of opposing ring-shaped surfaces of the upper and the lower drums are circumferentially even while a gap provided between the upper and lower drums varies.

A circular recessed portion 47 is formed in a disc portion 25 of a lower drum 5 concentrically with respect to the central axis of the disc portion 25. The widths of a ring-shaped surface 48 of the disc portion 25 and a facing ring-shaped surface 41 of an upper drum 6 are substantially equal about the circumference.

Steps 48b and 48c, which have different depths, are formed in the ring-shaped surface 48. A peripheral edge 48a is the same height over the entire circumference. The step 48b range from a position which is set 90° apart from the positions 30a and 30b and extends around the surface 48 for 135° at a depth which is the lowermost of the steps described (hereinafter, this step will be referred to as the lowermost stage). The step 48c ranges from the termination point of the lowermost stage 48b to a position which is 90° apart therefrom, also in the counterclockwise direction at a height slightly greater than that of the lowermost stage (hereinafter, this step will be referred to as a middle stage). The remainder, or a portion 43d excluding the stages 48b and 48c is provided on the same plane as the peripheral edge 48a (hereinafter, this portion will be referred to as the highest stage). Thus, the clearance h formed between the upper and lower drums 5 and 6 is greatest at the lowermost stage 48b, smallest at the highest stage 48d, and intermediate those of the highest and lowermost stages at the middle stage 48c.

According to the positional relationship between the lowermost, the middle, and the highest stages 48b, 48c, and 48d, the clearance at the tape wrapping initial position 30a is greatest, that at the position between the positions 30a and 30b (hereinafter, this position will be referred to as the tape wrapping central position) is intermediate, and that at the tape wrapping end position 30b is the smallest.

Therefore, depending upon the circumferential variation of the clearances as described above, the amount of air discharged between the circumferential surface 24 of the head drum and the magnetic tape 21 from the inner chamber 43 through the grooves 40 is, according to the above equation, smallest at the initial tape wrapping position 30a, intermediate at the tape wrapping central position, and greatest at the final tape wrapping position 30b. It will be appreciated that an air film is provided which has a uniform layer thickness formed by a mixture of the air moving together with the upper drum 6 and the air discharged through the grooves 40.

The constant height of the peripheral edge 48a of the ring-shaped surface 48 of the lower drum 5 provides only a very small clearance between the outer surface 30 of the lower drum and the outer surface 37 of the upper drum 6, preventing unstable wrapping and traveling of the magnetic tape about the peripheral surface of the head drum from occurring and prevents the tape from being damaged by the edge of the head drum.

In the second embodiment as described above, while a plurality of stages are provided in the upper surface of the lower drum to control the flow rate of air discharged through the grooves, a sloping surface which has a constantly increased depth may be provided in place of the stages which will also adjust the thickness of the air film precisely.

As is clear from the above, the first embodiment of the invention is provided with a head drum which includes generally an upper rotary drum and a lower stationary drum disposed concentrically therewith and having a given clearance therebetween. Internally, a plurality of grooves functioning as outlet ports discharging air in the head drum towards the outside thereof in response to the rotational operation of the head drum are provided which extend from the inner edge to the outer edge of the upper rotary drum. Moreover, a surface of the lower stationary drum opposing the lower surface of the upper drum has a width which gradually increases from the initial tape wrapping position to the final tape wrapping position. Therefore, rotational motion of the upper rotary drum causes air in the head drum to be discharged to the outside thereof through the grooves, thereby positively forming an air film at an area of the outer surface of the head drum where the drum is wrapped by the magnetic tape. The surface area where the upper and lower drums closely face each other becomes gradually wider from the initial tape wrapping position to the final tape wrapping position and thus the amount of air discharged to the outside of the head drum is small at the initial tape wrapping position, while it is greater at the final tape wrapping position, resulting in a uniform air film over the range between the tape wrapping initial position and the final tape wrapping position.

In the second embodiment of the invention, a plurality of grooves similar to the first embodiment are provided in the upper rotary drum. A staged clearance between the upper and the lower drums or a continuously varied clearance becomes narrower from the initial tape wrapping position to the final tape wrapping position.

Similarly to the first embodiment, rotational motion of the upper rotary drum causes air in the head drum to be discharged to the outside thereof through the grooves, thereby positively forming an air film at an area of the outer surface of the head drum where the drum is wrapped by magnetic tape. The amount of air discharged to the outside of the head drum is small at the initial tape wrapping position, while it is greater at the final tape wrapping position, resulting in a uniform air film over the range between the initial tape wrapping position and the final tape wrapping position.

Although the invention has been shown and described with respect to certain embodiments thereof, it should be understood by those skilled in the art that the foregoing and various other changes, omissions, and additions in the form and detail thereof may be made therein without departing from the spirit and scope of the invention. For example, the invention is applicable to a head drum which includes a rotary lower drum and a stationary upper drum. In this construction, a plurality of grooves (air outlet ports) may be formed in the surface of the upper drum.

The geometry of the grooves is not limited to an arc-shape; for example linear grooves may also be provided. The bottom surface of the upper drum may be machined to form the grooves or a plurality of teeth for forming air outlet ports each having a width wider than an interval between the outlet ports adjacent to each other to control the flow rate of air discharged therethrough.

What is claimed is:
1. A drum apparatus for producing an air film between an outer surface thereof and a tape medium wrapped about at least a portion of said outer surface, comprising:
 a stationary drum;
 a rotary drum positioned coaxially with said stationary drum; said stationary drum and said rotary drum defining a gap between respective opposed surfaces thereof;
 a plurality of spiral grooves formed in the one of said respective opposed surfaces on said rotary drum and extending from an inner position on said one respective opposed surface of said rotary drum to an outer periphery thereof for producing an air film by discharging air out from an inner portion of said drum apparatus to said outer surface thereof in response to rotation of said rotary drum;
 a peripheral portion of the other of said respective opposed surfaces on said stationary drum extending at least partially circumferentially about the axis of said stationary drum and being ring shaped, the width of said peripheral portion of said other respective opposed surface at an initial circumfer- ential position where said tape medium begins to wrap around said outer surface of said drum apparatus being narrower that at a final circumferential position thereof where the wrapping terminates.

2. A drum apparatus according to claim 1, wherein the width of said peripheral portion of said other respective opposed surface on said stationary drum progressively increases from said initial circumferential position to said final circumferential position.

3. A drum apparatus according to claim 1, further comprising magnetic recording and/or reproducing means mounted on said rotary drum for recording and/or reproducing signals on a magnetic tape wrapped circumferentially around said drum apparatus.

4. A drum apparatus according to claim 1, wherein said drum apparatus is operatively mounted in a video tape recorder system for recording and/or reproducing video signals.

5. A drum apparatus according to claim 1, wherein said drum apparatus is operatively mounted in an audio tape recorder system for recording and/or reproducing audio signals.

6. A drum apparatus for producing an air film between an outer surface thereof and a tape medium wrapped about at least a portion of said outer surface, comprising:
a stationary drum;
a rotary drum positioned coaxially with said stationary drum; said stationary drum and said rotary drum defining a predetermined gap between respective opposed surfaces thereof;
a plurality of spiral grooves formed in said respective opposed surface of said rotary drum extending from an inner position on said respective opposed surface of said rotary drum to an outer periphery thereof for producing an air film by discharging air out from an inner portion of said drum apparatus to said outer surface thereof in response to rotation of said rotary drum;
said predetermined gap being wider at a first circumferential starting position wherein said tape medium begins to wrap around said outer surface of the drum apparatus than at a second circumferential position where the wrapping terminates.

7. A drum apparatus according to claim 6, wherein said respective opposed surface of said stationary drum is formed in a plurality of circumferentially spaced portions at respectively different axial elevations with respect to said respective opposed surface of said rotary drum.

8. A drum apparatus according to claim 6, wherein said respective opposed surface of said stationary drum is formed to extend circumferentially at progressively different axial elevations varying substantially continuously.

9. A drum apparatus according to claim 6, further comprising magnetic recording and/or reproducing means mounted on said rotary drum for recording and/or reproducing signals on a magnetic tape wrapped circumferentially around said drum apparatus.

10. A drum apparatus according to claim 6, wherein said drum apparatus is operatively mounted in a video tape recorder system for recording and/or reproducing video signals.

11. A drum apparatus according to claim 6, wherein said drum apparatus is operatively mounted in an audio tape recorder system for recording and/or reproducing audio signals.

12. A head drum for a recording and/or reproducing apparatus comprising:
a stationary drum;
a rotary drum having a first surface opposing a second surface of said stationary drum; said second surface of said stationary drum and said first surface of said rotary drum defining a gap therebetween;
recording and/or reproducing means for recording signals on and/or reproducing signals from a recording medium, provided on said rotary drum adjacent to said stationary drum;
said head drum defining an air chamber including a first circumferentially extending portion formed in the rotary drum recessed from the first surface thereof and a second circumferentially extending portion formed in the stationary drum recessed from the second surface thereof; and
means for discharging air from said chamber to an exterior of the head drum during rotation of said rotary drum;
said second circumferentially extending portion being disposed relative closer to a peripheral surface of the head drum at a first position where in operation the recording medium starts to wrap about said peripheral surface of the head drum than at a second position where the wrapping of the recording medium thereabout terminates for discharging air at a flow rate which is lower adjacent said first position than a flow rate thereof adjacent said second position of said peripheral surface of the head drum so that the discharged air forms a substantially uniform air film between the recording medium and the peripheral surface of the head drum in cooperation with circumambient air introduced therebetween with the rotation of said rotary drum.

13. A head drum as set forth in claim 12, wherein said means for discharging air from said chamber includes a plurality of grooves formed in said first surface of said rotary drum for discharging the air in said chamber to the exterior thereof.

14. A head drum as set forth in claim 13, wherein said grooves are arc-shaped and arranged in the first surface of said rotary drum at regular intervals.

15. A head drum as set forth in claim 12, wherein said rotary drum is provided with air intake means for introducing circumambient air into said air chamber.

16. A head drum for a recording and/or reproducing apparatus comprising:
a stationary drum;
a rotary drum having a first surface opposing a second surface of said stationary drum; said second surface of said stationary drum and said first surface of said rotary drum defining a gap therebetween;
recording and/or reproducing means for recording signals on and/or reproducing signals from a recording medium, provided on said rotary drum adjacent to said stationary drum;
said head drum defining an air chamber including a first circumferentially extending portion provided in said rotary drum recessed from the first surface thereof and a second circumferentially extending portion provided in said stationary drum recessed from the second surface thereof;
means for discharging air from said chamber to an exterior of the head drum during rotation of said rotary drum; said means for discharging air from said chamber including a plurality of grooves communicating between the first circumferentially extending portion and the exterior of the head drum; and means for controlling the flow rate of the discharged air including a stepped portion formed in said second surface of the stationary drum such that the stepped portion is farthest from the first surface of the rotary drum at a first position of a peripheral surface of the head drum where in operation the recording medium starts to wrap about said peripheral surface of the head drum and becomes progressively closer thereto circumferentially from the first position to a second position of said peripheral surface of the head drum where the wrapping of the recording medium thereabout terminates to provide the greatest flow rate of discharged air through the grooves at the second position so that the discharged air forms a substantially uniform air film between the recording medium and the peripheral surface of the head drum in cooperation with circumambient air introduced therebetween with the rotation of said rotary drum.

17. A head drum as set forth in claim 16, wherein said stepped portion includes a plurality of stages, said stages decreasing in depth with respect to said rotary drum from the first position to the second position so that the flow rate of air discharged to the outside of the head drum through the grooves is greatest at the second position.

18. A head drum as set forth in claim 16, wherein said rotary drum is provided with air intake means for introducing circumambient air into said air chamber.

19. A head drum for a recording and/or reproducing apparatus comprising:
a stationary drum;
a rotary drum having a first surface opposing a second surface of said stationary drum; said first surface of said rotary drum and said second surface of said stationary drum defining a gap therebetween;
recording and/or reproducing means for recording signals on and/or reproducing signals from a recording medium wrapping about a circumferential surface of the head drum, said recording and/or reproducing means being provided on said rotary drum adjacent to said stationary drum;
said head drum defining an air chamber including a first circumferentially extending portion formed in the rotary drum recessed from the first surface thereof and a second circumferentially extending portion formed in the stationary drum recessed from the second surface thereof; and
means for discharging air in said chamber through said circumferential surface of the head drum;
said second circumferentially extending portion being disposed relatively closer to said circumferential surface at a first position thereof where in operation the recording medium starts to wrap about the circumferential surface of the head drum than at a second circumferential surface thereof where the wrapping of the recording medium terminates for discharging air at a flow rate which is lower adjacent said first position than a flow rate thereof adjacent said second position so that the discharged air forms and essentially uniform air film between the recording medium and the circumferential surface of the head drum in cooperation with the circumambient air introduced therebetween in response to the rotation of said rotary drum.

20. A head drum as set forth in claim 19, wherein said rotary drum is provided with air intake means for introducing circumambient air into said chamber.

21. A head drum for a recording and/or reproducing apparatus comprising:
a stationary drum;
a rotary drum having a first surface opposing a second surface of said stationary drum; said first surface of said rotary drum and said second surface of said stationary drum defining a gap therebetween;
recording and/or reproducing means for recording signals on and/or reproducing signals from a recording medium wrapping about a circumferential surface of the head drum, said recording and/or reproducing means being provided on said rotary drum adjacent to said stationary drum;
said head drum defining an air chamber therein;
first means for discharging air in said chamber through said circumferential surface of the head drum including a plurality of grooves formed in said first surface of said rotary drum; and
means for restricting the flow rate of air discharged through said circumferential surface of the head drum by said first means in a vicinity of said circumferential surface where in operation said rotary drum engages the recording medium as it wraps about the circumferential surface of the head drum so that the discharged air forms an essentially uniform air film between the recording medium and the circumferential surface of the head drum in cooperation with circumambient air introduced therebetween in response to the rotation of said rotary drum.

22. A head drum as set forth in claim 21, wherein said grooves are arc-shaped and are formed in the first surface of said rotary drum at regular intervals.

23. A head drum for a recording and/or reproducing apparatus comprising:
a stationary drum;
a rotary drum having a first surface opposing a second surface of said stationary drum; said first surface of said rotary drum and said second surface of said stationary drum defining a gap therebetween;
recording and/or reproducing means for recording signals on and/or reproducing signals from a recording medium wrapping about a circumferential surface of the head drum, said recording and/or reproducing means being provided on said rotary drum adjacent to said stationary drum;
said head drum defining an air chamber including a first circumferentially extending portion provided in said rotary drum recessed from the first surface thereof and a second circumferentially extending portion provided in said stationary drum recessed from the second surface thereof;
first means for discharging air in said chamber through said circumferential surface of the head drum including a plurality of grooves formed in said first surface of said rotary drum and communicating between the first circumferentially extending portion and the exterior of the rotary drum; and
second means for restricting the flow of air discharged through said circumferential surface of the head drum by said first means adjacent a first position of said circumferential surface where in operation said rotary drum engages the recording medium as it wraps about the circumferential surface of the head drum, said second means including a portion formed in said second surface of the stationary drum such that said portion is spaced farthest from said first surface of said rotary drum at said first position and is arranged progressively closer to said first surface of said rotary drum at circumferential positions progressing from said first position to a second position where the wrapping of the recording medium terminates to provide the greatest flow rate of discharged air at the second position, so that the discharged air forms an essentially uniform air film between the recording medium and the circumferential surface of the head drum in cooperation with circumambient air introduced therebetween in response to the rotation of said rotary drum.

24. A head drum as set forth in claim 23, wherein said portion is stepped to define a plurality of circumferentially extending stages, each of said stages being spaced by a respective distance from said first surface of said rotary drum, said respective distance of each of said stages decreasing from the first position to the second position so that the flow rate of air discharged to the outside of the head drum through the grooves is greatest at the second position.

25. A head drum as set forth in claim 23, wherein said rotary drum is provided with air intake means for introducing circumambient air into said chamber.

* * * * *